United States Patent
Wilson et al.

(10) Patent No.: US 12,468,609 B2
(45) Date of Patent: Nov. 11, 2025

(54) FAILOVER OF DOMAINS

(71) Applicant: Oracle International Corporation, Redwood Shores, CA (US)

(72) Inventors: Gregg Alan Wilson, Austin, TX (US); Martinus Petrus Lambertus van den Dungen, Snohomish, WA (US); Arsalan Ahmad, Redmond, WA (US); Robert Lee Tesch, II, Seattle, WA (US); Girish Nagaraja, Sammamish, WA (US); Lokesh Gupta, Belmont, CA (US); Nikhil Yograj Vaishnavi, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 2 days.

(21) Appl. No.: 18/050,457

(22) Filed: Oct. 27, 2022

(65) Prior Publication Data
US 2023/0140149 A1   May 4, 2023

Related U.S. Application Data

(60) Provisional application No. 63/273,823, filed on Oct. 29, 2021.

(51) Int. Cl.
*G06F 11/20* (2006.01)
*G06F 11/07* (2006.01)

(52) U.S. Cl.
CPC ...... *G06F 11/2025* (2013.01); *G06F 11/0709* (2013.01); *G06F 11/2048* (2013.01); *G06F 2201/85* (2013.01)

(58) Field of Classification Search
CPC ............ G06F 11/2025; G06F 11/0709; G06F 11/2048; G06F 2201/85
See application file for complete search history.

(56) References Cited

U.S. PATENT DOCUMENTS

| | | | |
|---|---|---|---|
| 9,336,292 B2 | 5/2016 | McAlister et al. |
| 9,781,122 B1 | 10/2017 | Wilson et al. |
| 9,838,376 B1 | 12/2017 | Lander et al. |
| 10,255,061 B2 | 4/2019 | Lander et al. |
| 10,341,410 B2 | 7/2019 | Lander et al. |
| 10,425,386 B2 | 9/2019 | Wardell et al. |

(Continued)

OTHER PUBLICATIONS

Chapter 3. Preparing for Server Loss with Replication, Red Hat Customer Portal, Available Online at https://access.redhat.com/documentation/en-us/red_hat_enterprise_linux/8/html/preparing_for_disaster_recovery_with_identity_management/preparing-for-server-loss-with-replication_preparing-for-disaster-recovery, Accessed from Internet on Dec. 3, 2021, 5 pages.

Cross-Cluster Replication, Available Online at https://www.elastic.co/guide/en/elasticsearch/reference/current/xpack-ccr.html, 2021, 7 pages.

(Continued)

*Primary Examiner* — Marc Duncan
*Assistant Examiner* — Michael Xu
(74) *Attorney, Agent, or Firm* — Kilpatrick Townsend & Stockton LLP

(57) ABSTRACT

An approach of performing data center failover using an address that indicates a backup data center. The address includes common names indicating a data center with a domain and a backup datacenter with a replica of the domain. A cloud service provider can receive the address, establish a connection with an available data center, and failover to the backup data center if the data center with the connection becomes unavailable.

20 Claims, 11 Drawing Sheets

(56) References Cited

U.S. PATENT DOCUMENTS

| | | | |
|---|---|---|---|
| 10,454,940 B2 | 10/2019 | Lander et al. | |
| 10,484,243 B2 | 11/2019 | Cole et al. | |
| 10,484,382 B2 | 11/2019 | Wilson et al. | |
| 10,511,589 B2 | 12/2019 | Gangawane et al. | |
| 10,594,684 B2 | 3/2020 | Bansal et al. | |
| 10,616,224 B2 | 4/2020 | Subramanian et al. | |
| 10,715,564 B2 | 7/2020 | Mohamad Abdul et al. | |
| 10,798,165 B2 | 10/2020 | Srinivasan et al. | |
| 10,846,390 B2 | 11/2020 | Subramanian et al. | |
| 10,878,079 B2 | 12/2020 | Vepa et al. | |
| 10,931,656 B2 | 2/2021 | Carru et al. | |
| 11,061,929 B2 | 7/2021 | Xu et al. | |
| 11,165,634 B2 | 11/2021 | Medam et al. | |
| 11,308,132 B2 | 4/2022 | Srinivasan et al. | |
| 11,321,343 B2 | 5/2022 | Srinivasan et al. | |
| 11,709,741 B1* | 7/2023 | Uppal | G06F 11/0709 714/4.11 |
| 2010/0235431 A1* | 9/2010 | Poluri | G06F 11/2071 714/4.11 |
| 2013/0066834 A1* | 3/2013 | McAlister | G06F 16/27 707/634 |
| 2020/0073770 A1* | 3/2020 | Mortimore, Jr. | G06F 11/2035 |
| 2020/0264860 A1 | 8/2020 | Srinivasan et al. | |
| 2021/0081252 A1 | 3/2021 | Bhargava et al. | |
| 2021/0084031 A1 | 3/2021 | Lao et al. | |
| 2021/0119940 A1* | 4/2021 | Kumar | G06F 9/45558 |
| 2021/0385332 A1* | 12/2021 | Edamadaka | H04M 3/5191 |
| 2023/0021195 A1* | 1/2023 | Yang | G06F 11/2094 |

OTHER PUBLICATIONS

How Does Azure Cosmos DB Provide High Availability, Available Online at: https://docs.microsoft.com/en-us/azure/cosmos-db/high-availability#slas-for-availability, Nov. 11, 2021, 12 pages.

Implementation of vSphere Replication for the Management Domain, Site Protection and Disaster Recovery for VMware Cloud Foundation, Available Online at https://docs.vmware.com/en/VMware-Cloud-Foundation/services/vcf-site-protection-and-disaster-recovery-v1/GUID-36509353-C85C-4D9B-AA9F-D83D4DC7F0F6.html, Oct. 5, 2021, p. 72.

Multi-Region N-Tier Application, Azure Architecture Center, Microsoft Docs, Available Online at https://docs.microsoft.com/en-us/azure/architecture/reference-architectures/n-tier/multi-region-sql-server, Accessed from Internet on Dec. 3, 2021, 10 pages.

SteelFusion Replication (FusionSync), Available Online at https://support.riverbed.com/bin/support/static/42v83tinf0q0n0a11t53ojb0h5/html/i5hjt31353I5h69p330ith37hb/sf_4.5_dg_html/index.html#page/steelfusion_dg_4.5/DG_replication.html, Accessed from Internet on Dec. 3, 2021, 10 pages.

Estrin, Using the Cloud to Build Multi-Region Architecture, EuropeClouds.com from Cloud Computing Global, Available Online at https://www.europeclouds.com/blog/using-the-cloud-to-build-multi-region-architecture, Jun. 13, 2020, 11 pages.

Mariusz, NetBackup Auto Image Replication (AIR) Overview, Settlersoman—A settler in the SDDC world, Available Online at https://www.settlersoman.com/netbackup-auto-image-replication-air-overview/, Aug. 20, 2015, 4 pages.

* cited by examiner

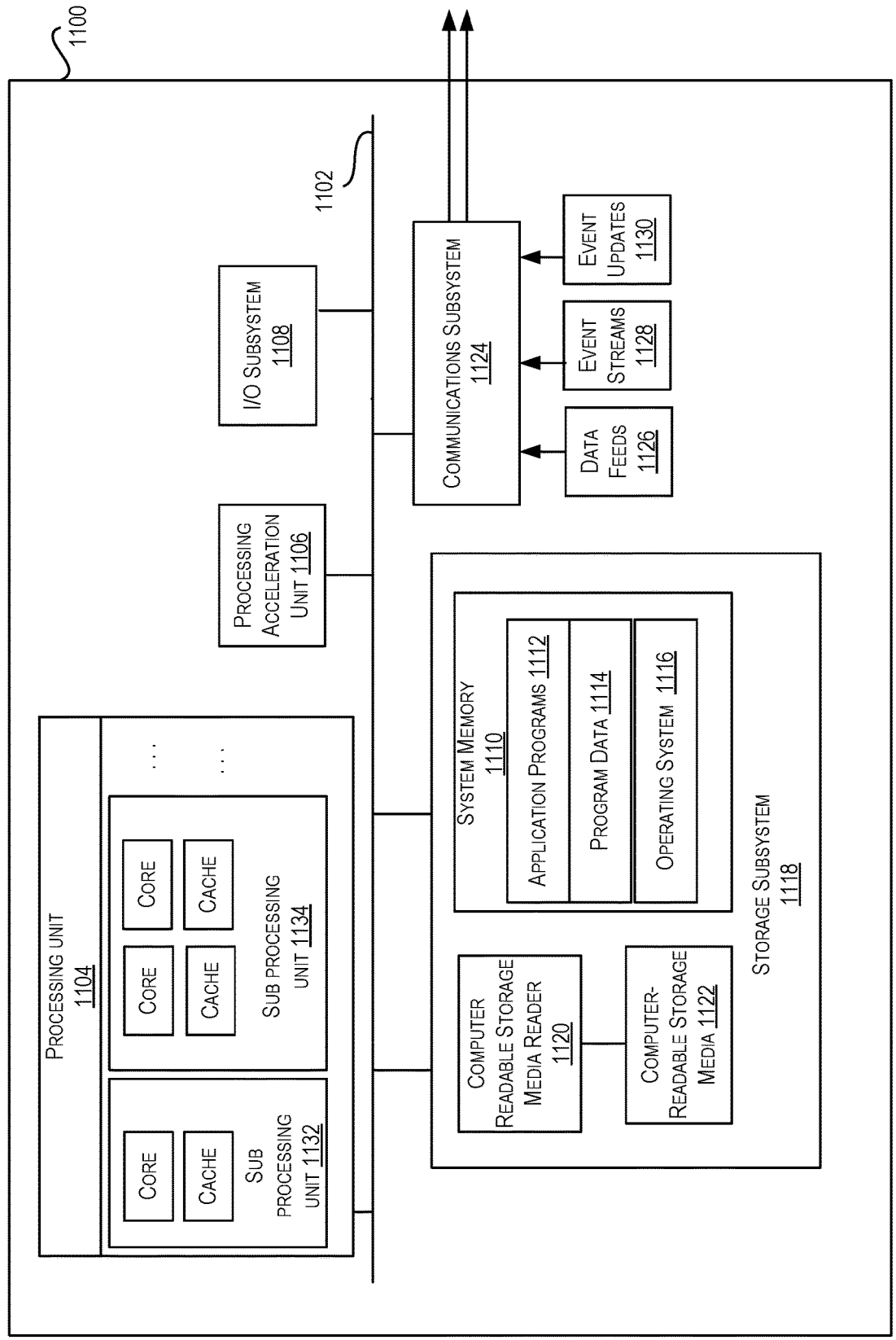

FAILOVER OF DOMAINS

CROSS-REFERENCE TO RELATED APPLICATIONS

This application claims priority to U.S. provisional application No. 63/273,823, entitled "Failover of Domains", filed on Oct. 29, 2021, the disclosure of which is incorporated by reference herein in its entirety for all purposes.

BACKGROUND

A cloud service provider (CSP) can include multiple data centers that can provide services to users. Each of the data centers can have domains that can be accessed to provide services to the users. However, the data centers may have issues that can cause the data centers to become unavailable to the users.

When a data center becomes unavailable when a user is making use of the data center, the user may be dropped and the services provided by the data center may become unavailable to the user. In some approaches, the user may be transferred to another data center that can provide services to the user. However, these legacy approaches of transferring a user to another data center can take a significant amount of time to transfer the user to another data center.

SUMMARY

An aspect of the present disclosure is directed to a method for failover of a domain, where the method may include providing, by a cloud service provider (CSP), access to a domain that resides in a first data center located in a first geographic region based at least in part on an address that indicates the first data center located in the first geographic region and a second data center located in a second geographic region. The method may further include determining, by the cloud service provider, that the first data center in the first geographic region has become unavailable, and determining, by the cloud service provider, that the second data center in the second geographic region is to be utilized as a backup data center for the domain based at least in part on the address. Further, the method may include providing, by the cloud service provider, access to a replica of the domain that resides in the second data center in the second geographic region based at least in part on the determination that the second data center in the second geographic region is to be utilized as the backup data center and the determination that the first data center in the first geographic region has become unavailable.

An aspect of the present disclosure is directed to one or more non-transitory computer-readable media having instructions stored thereon, wherein the instructions, when executed by one or more processors, may cause a cloud service provider to provide access to a domain that resides in a first data center located in a first geographic region based at least in part on an address that indicates the first data center located in the first geographic region and a second data center located in a second geographic region. The instructions, when executed by the one or more processors, may further cause the cloud service provider to determine that the first data center located in the first geographic region has become unavailable, and determine that the second data center located in the second geographic region is to be utilized as a backup data center for the domain based at least in part on the address. Further, the instructions, when executed by the one or more processors, may cause the cloud service provider to provide access to a replica of the domain that resides in the second data center located in the second geographic region based at least in part on the determination that the second data center located in the second geographic region is to be utilized as the backup data center and the determination that the first data center located in the first geographic region has become unavailable.

An aspect of the present disclosure is directed to a cloud service provider that may include one or more data centers located in one or more geographic regions to provide services to one or more user devices, and one or more processors to control access to the one or more data centers located in the one or more geographic regions. The one or more processors may cause access to be provided to a domain that resides in a first data center located in a first geographic region based at least in part on an address that indicates the first data center located in the first geographic region and a second data center located in a second geographic region. The one or more processors may further determine that the first data center located in the first geographic region has become unavailable, and determine that the second data center located in the second geographic region is to be utilized as a backup data center for the domain based at least in part on the address. Further, the one or more processors may cause access to be provided to a replica of the domain that resides in the second data center located in the second geographic region based at least in part on the determination that the first data center located in the first geographic region has become unavailable.

The foregoing, together with other features and embodiments will become more apparent upon referring to the following specification, claims, and accompanying drawings.

BRIEF DESCRIPTION OF THE DRAWINGS

FIG. 11 is a block diagram illustrating an example computer system, according to at least one embodiment.

DETAILED DESCRIPTION

Figure 1:
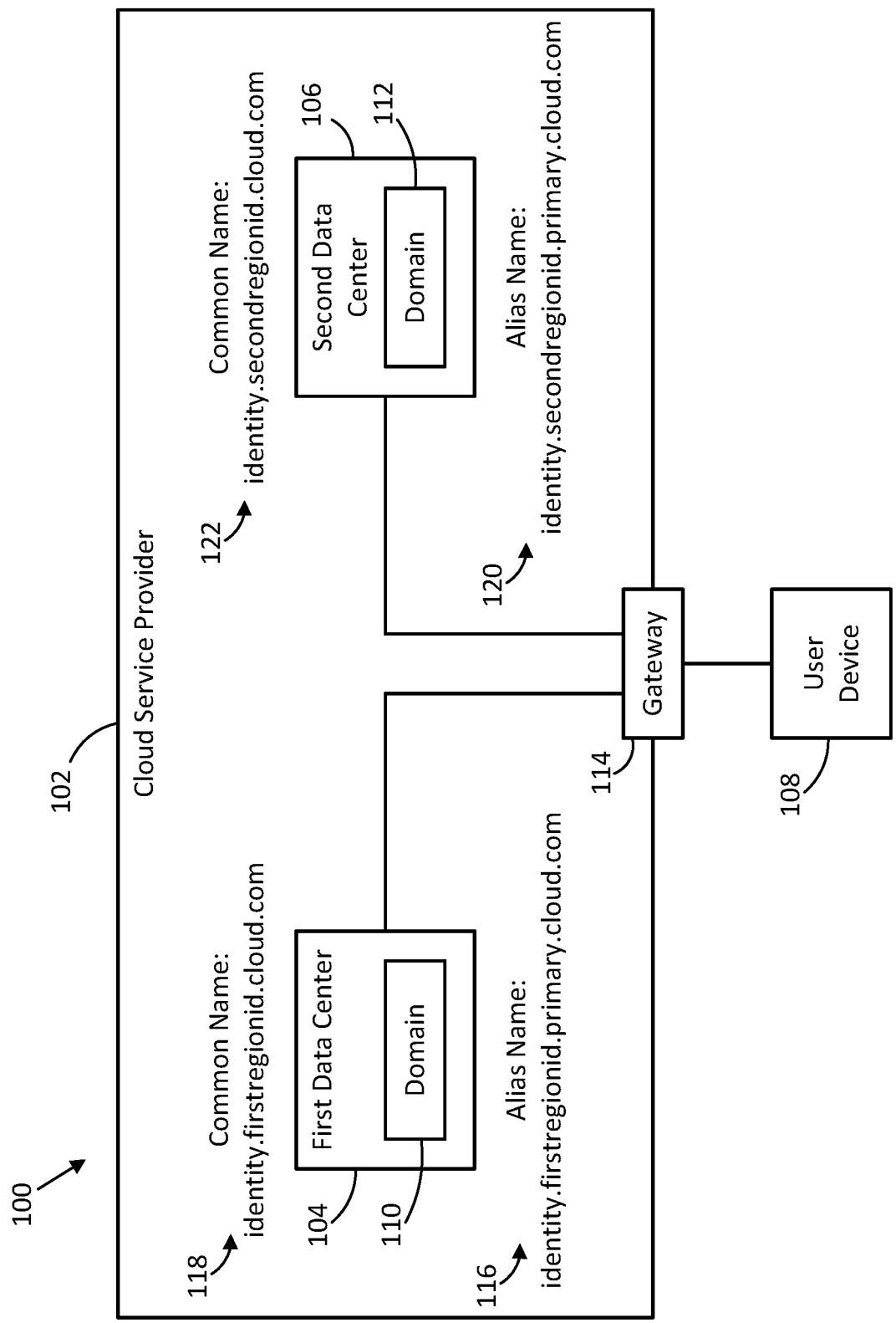
FIG. 1 illustrates an example cloud service provider (CSP) arrangement, according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

A cloud service provider (CSP) may provide multiple cloud services to subscribing customers. These services may be provided under different models including a Software-as-a-Service (SaaS), Platform-as-a-Service (PaaS), an Infrastructure-as-a-Service (IaaS) model, and others.

In the cloud environment, an identity management system is generally provided by the CSP to control user access to resources provided or used by a cloud service. Typical services or functions provided by an identity management system include, without restriction, single-sign on capabilities for users, authentication and authorization services, and other identity-based services.

The resources that are protected by an identity management system can be of different types such as compute instances, block storage volumes, virtual cloud networks (VCNs), subnets, route tables, various callable APIs, internal or legacy applications, and the like. These resources include resources stored in the cloud and/or customer on-premise resources. Each resource is typically identified by a unique identifier (e.g., an ID) that is assigned to the resource when the resource is created.

A CSP may provide two or more separate and independent identity management systems for their cloud offerings. This may be done, for example, where a first identity management system or platform (e.g., Infrastructure Identity and Access Management (IAM)) may be provided for controlling access to cloud resources for IaaS applications and services provided by the CSP. Separately, a second identity management system or platform (e.g., Identity Cloud Services (IDCS)) may be provided for security and identity management for SaaS and PaaS services provided by the CSP.

As a result of providing such two separate platforms, if a customer of the CSP subscribes to both a SaaS or PaaS service and an IaaS service provided by the CSP, the customer generally has two separate accounts—one account with IAM for the IaaS subscription and a separate account with IDCS for the PaaS/SaaS subscription. Each account will have its own credentials, such as user login, password, etc. The same customer thus has two separate sets of credentials for the two accounts. This results in an unsatisfactory customer experience. Additionally, having two separate identity management systems also creates obstacles for interactions between SaaS/PaaS and IaaS services.

For purposes of this application, and as an example, the two platforms are referred to as IAM and IDCS. These names and terms are however not intended to be limiting in any manner. The teachings of this disclosure apply to any situation where two (or more) different identity management systems are to be integrated. The identity management systems, services, or platforms to be integrated may be provided by one or more CSPs.

In certain embodiments, an integrated identity management platform (referred to as Integrated Identity Management System (IIMS)) is provided that integrates the multiple identity management platforms (e.g., IAM and IDCS platforms) in a manner that is transparent to the users or customers of the cloud services while retaining and offering the various features and functionalities offered by the two separate (e.g., IAM and IDCS) platforms. The integration thus provides a more seamless and enhanced user experience.

This integration however is technically very difficult for several reasons. The two platforms may use different procedures and protocols for implementing the identity-related functions. IAM may, for example, be an attribute-based access control (ABAC) system, also known as policy-based access control system, which defines an access control paradigm whereby access rights are granted to users through the use of policies that express a complex Boolean rule set that can evaluate many different attributes. The purpose of ABAC is to protect objects such as data, network devices, and IT resources from unauthorized users and actions—those that do not have "approved" characteristics as defined by an organization's security policies. On the other hand IDCS may be a role-based access control (RBAC) system which is a policy-neutral access-control mechanism defined around roles and privileges. The components of RBAC such as role-permissions, user-role and role-role relationships make it simple to perform user assignments. As yet another reason, the authentication and authorization frameworks or workflows (e.g., types of tokens that are used, different authentication frameworks such as OAUTH, etc.) used by the two platforms may be different. This is just a small sampling of reasons why providing an integrated solution is technically very difficult.

Techniques for customer and/or client (which is referred to collectively as a customer throughout the disclosure) to switch a home region of a CSP are described herein. For example, a CSP may include one or more data centers (which also may be referred to as regions), where each data center may be located in a corresponding geographic area serviced by the CSP. For example, a first data center may be located in a first geographic area serviced by the CSP and a second data center may be located in a second geographic area service by the CSP, where the second geographic area is different from the first geographic area. Each data center may comprise computer hardware and/or software that can provide one or more services to customers. The data centers may store one or more domains, such as identity domains. In some embodiments, the domain may comprise a container that includes data, such as data that indicates access information for the customer and/or services that can be provided to the customer.

For a customer, the CSP may have one or more domains corresponding to the customer replicated in multiple data centers. Unluckily, one or more data centers of a CSP may become unavailable (for example, the data centers may be down or services within the data center may be unreachable) during operation. When a customer is utilizing a domain in a first data center that becomes unavailable while the customer is utilizing the data center, the CSP may redirect operation for the customer to the replicated domain in a second data center that is still available. The second data center to which the CSP redirects operation for the customer may be defined by the customer. The CSP may automatically redirect the operation for the customer to the replicated domain in the second data center in response to the first data center becoming unavailable. A domain name system (DNS) address for the domain may indicate both the first data center to which the customer originally signs into the domain and the second data center to which the customer is redirected based on the first data center becoming unavailable. The redirection and/or the implementation of the DNS address may keep the domain available and cause less delay than if the redirection and/or DNS address were not implemented.

FIG. 1 illustrates an example CSP arrangement 100, according to at least one embodiment. The CSP arrangement 100 illustrates an example arrangement illustrating how a user may access a CSP and the services provided by the CSP.

The CSP arrangement 100 may include a CSP 102. The CSP 102 may include hardware and software capable of providing one or more services to customers. For example, the CSP 102 may include one or more computer hardware elements that may implement software to provide one or more defined services to the customers. The CSP 102 may be protected such that authorized customers may be allowed to access the CSP 102 and utilize the services, while unauthorized users may be prevented from accessing the CSP 102 and utilizing the services.

The CSP 102 may include one or more data centers. The data centers may comprise computer hardware and/or software. The data centers may make up the CSP 102 and may provide the services. Each of the data centers may correspond to different geographic regions. The CSP 102 may include a first data center 104 and a second data center 106 in an illustrated embodiment. The first data center 104 may be located in a first geographic region and the second data center 106 may be located in a second geographic region.

The CSP arrangement 100 may include a customer device 108. The customer device 108 may comprise a computer device. The customer device 108 may be operated by a customer. The customer may be subscribed with one or more data centers of the CSP 102. For example, the customer may be subscribed to the first data center 104 and the second data center 106 in the illustrated embodiment. The customer may be able to utilize one or more of the services provided by the data centers to which the customer is subscribed. For example, the customer may be able to utilize one or more of the services provided by the first data center 104 and the second data center 106. The CSP 102 may maintain an account that indicates the data centers to which the customer is subscribed and/or additional information related to the customer. The account may further include information that can be utilized for authorizing the customer to access the CSP 102.

The data centers may store one or more domains. The domains may be associated with a customer, such as the customer that operates the customer device 108. In some instances, one or more domains may be replicated in multiple regions. For example, multiple data centers in different regions may store copies of a same domain. In the illustrated embodiment, the first data center 104 may store a first copy of a domain 110 and the second data center 106 may store a second copy of the domain 112.

The CSP arrangement 100 may include a gateway 114. The gateway 114 may be coupled to one or more data centers of the CSP 102. The gateway 114 may be located at the edge of the CSP 102 and may provide access to the CSP 102. For example, the gateway 114 may provide access to the data centers to which the gateway 114 is coupled. In the illustrated embodiment, the gateway 114 is coupled to the first data center 104 and the second data center 106. The gateway 114 may be able to establish connections between devices and the regions.

The data centers coupled to the gateway 114 may correspond to unique domain name system (DNS) addresses. For example, the first data center 104 may correspond to a first DNS address and the second data center 106 may correspond to a second DNS address. In response to the gateway 114 receiving a request from a device that indicates a DNS address, the gateway 114 may establish a connection between the device and the data center corresponding to the DNS address. Each of the data centers may have a common name and an alias name that identifies the particular data center. The alias name may be a name for an Internet protocol (IP) address and may point to a physical machine corresponding to the data center associated with the alias name. The common name may point to another name for the corresponding data center, such as pointing to the alias name associated with the data center or another common name associated with the data center. The common name, and format thereof (e.g., DNS address, string, hexadecimal number, etc.), may be defined by an individual (such as a programmer, an engineer, and/or a user) or the CSP. In the illustrated embodiment, the common names have been defined as DNS addresses. Each of a common name and an alias name for a same data center may be mapped to a same IP address. In the illustrated embodiment, the first data center 104 may be associated with a first alias name 116 of identity.firstregionid.primary.cloud.com. Further, the first data center 104 may be associated with a first common name 118 of identity.firstregionid.cloud.com. The second data center 106 may be associated with a second alias name 120 of identity.secondregion.id.primary.cloud.com in the illustrated embodiment. Further, the second data center 106 may be associated with a second common name 122 of identity.secondregionid.cloud.com.

A user of the customer device 108 may input a common name or an alias name corresponding to a data center to access the data center. For example, the customer device 108 may provide the common name or the alias name to the gateway 114 and the gateway 114 may determine which data center is to have a connection established with the customer device 108 based on the common name or the alias name provided to the gateway 114 by the customer device 108. For example, the gateway 114 may determine that a connection is to be established between the customer device 108 and the first data center 104 based on the customer device 108 providing the first alias name 116 or the first common name 118 to the gateway 114 in the illustrated embodiment. The gateway 114 may determine that a connection is to be established between the customer device 108 and the second data center 106 based on the customer device 108 providing the second alias name 120 or the second common name 122 to the gateway 114.

The approaches described herein may utilize the relationship between the common names and the alias names for the data centers to perform automated and/or simplified updates of the mapping between the common names and the alias names. For example, the approaches described herein may define a common name that may be utilized for automated and/or simplified update of the mapping of the common name from a first alias name to a second alias name in response to a first data center corresponding to the first alias name becoming unavailable.

Figure 2:
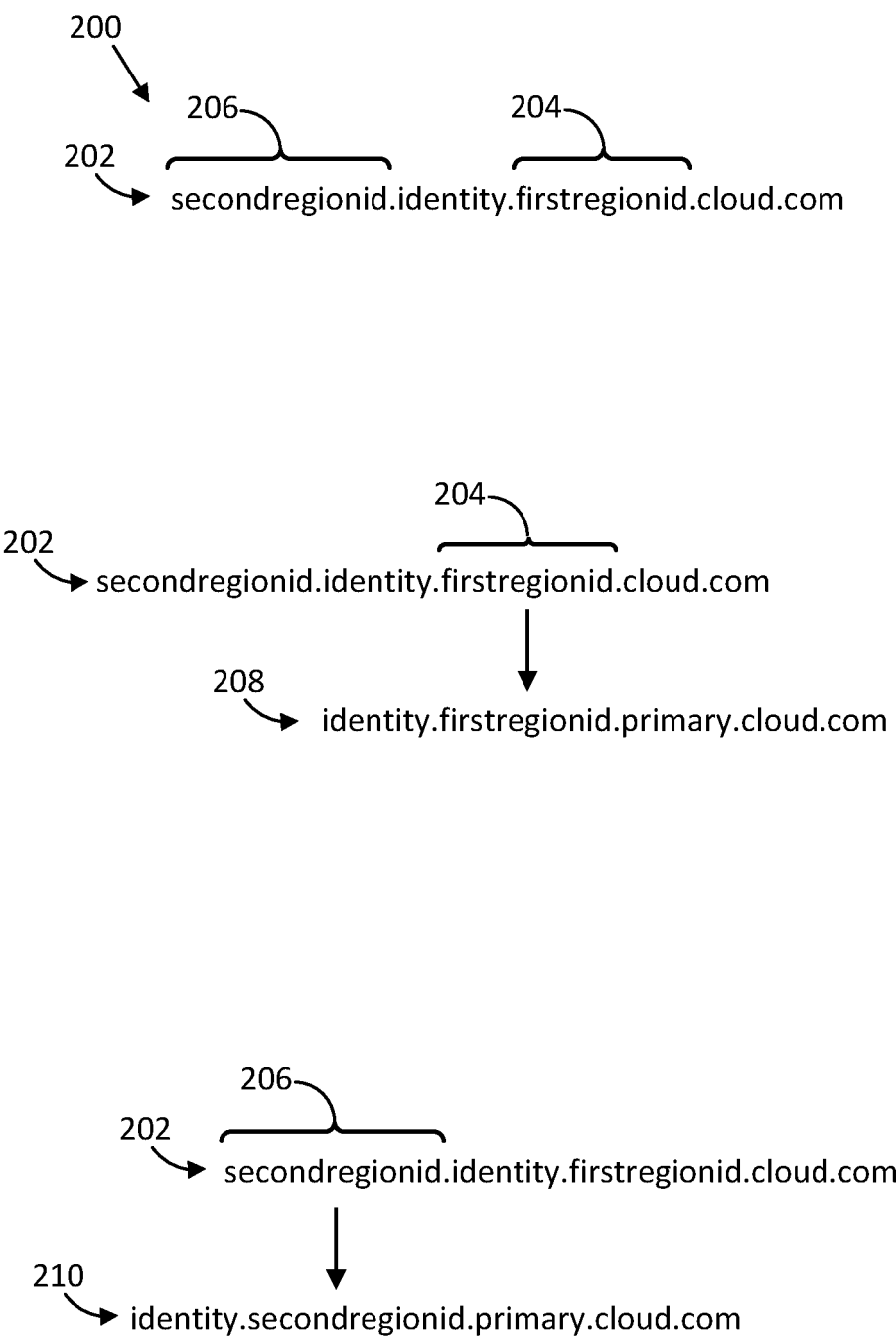
FIG. 2 illustrates an example mapping arrangement, according to at least one embodiment.

FIG. 2 illustrates an example mapping arrangement 200, according to at least one embodiment. For example, a mapping arrangement 200 illustrates an address and mappings to alias names that exist while a first data center is available and while the second data center is available.

The mapping arrangement 200 includes an address 202. The address 202 may be defined by a CSP (such as the CSP 102 (FIG. 1)) or a customer device (such as the customer device 108 (FIG. 1)). The example address 202 is a DNS address that can be utilized for accessing the CSP. The address 202 may be mapped to a plurality of alias names based on states of the data centers associated with the alias names. For example, the address 202 may map to one alias name for one state of the data centers associated with the alias names and may map to another alias name for another state of the data centers. In the illustrated embodiment, the address 202 maps to multiple alias names including a first alias name for a first state of the data centers and a second alias name for a second state of the data centers.

More specifically, a first common name within address 202 maps to the first alias name and a second common name within address 202 maps to the second alias name. The address 202 includes a first common name 204 that maps to the first alias name, and a second common name 206 that maps to the second alias name. For example, the first common name 204 of the address 202 may map to a first alias name 208 of identity.firstregionid.primary.cloud.com. The second common name 206 of the address 202 may map to a second alias name 210 of identity.secondregionid.primary.cloud.com. Each of the alias names, which are DNS addresses in the present example, may be mapped to a regional IP address for a corresponding data center. For example, the first alias name 208 may be mapped to a first regional IP address for a first data center and the second alias name 210 may be mapped to a second regional IP address for a second data center. Furthermore, one or more of the alias names may be IP addresses for corresponding data centers.

A customer and/or the CSP may define the alias names and/or the data centers to which each common name of the address 202 is mapped. Additionally, one or more of the alias names and/or the data centers may be defined as backups to one or more of the other alias names and/or data centers. For example, the first common name 204 of the address 202 is defined to correspond to a preferred alias name and/or data center. The second common name 206 of the address 202 is defined to correspond to a backup alias name and/or data center, where the backup alias name and/or data center is a backup for the preferred alias name and/or data center.

In some embodiments, the customer may select a preferred alias name and/or data center and a backup alias name and/or data center for the address 202. A customer device (such as the customer device 108 (FIG. 1)) operated by the customer may indicate the preferred alias name and/or data center and the backup alias name and/or data center to the CSP. The CSP may generate the address 202 based on the indication of the preferred alias name and/or data center and the backup alias name and/or data center. For example, the CSP may set the first common name 204 to a value (in the illustrated embodiment the value is "firstregionid") corresponding to the preferred alias name and/or data center. The CSP may set the second common name 206 to a value (in the illustrated embodiment the value is "secondregionid") corresponding to the backup alias name and/or data center.

In some embodiments, the CSP may define a preferred alias name and/or data center and a backup alias name and/or data center for the address 202. The CSP may define the preferred alias name and/or data center to correspond to a first data center with which the customer subscribed or a data center to which the customer has subscribed that is closest in geographical proximity to the customer. Further, the CSP may define the backup alias name and/or data center to correspond to a second data center with which the customer subscribed or a data center to which the customer has subscribed that is second closest in geographical proximity to the customer. The CSP may set the first common name 204 to a value corresponding to the preferred alias name and/or data center. The CSP may set the second common name 206 to a value corresponding to the backup alias name and/or data center.

In some embodiments, the customer device may generate the address and store the address to be utilized for access to the CSP and/or the domains. In other embodiments, the CSP may provide the address 202 to the customer device to be utilized to sign on to the CSP and/or to access the domains. The customer device may store the address for accessing the CSP and/or the domains.

When the customer attempts to connect to the CSP, the customer device may provide the address to a gateway (such as the gateway 114 (FIG. 1)). The gateway may be configured to process addresses of the format of the address 202. For example, the gateway may be configured to identify the first common name 204 and the second common name 206 of the address 202, such as being aware of the locations for the first common name 204 and the second common name 206 within the address 202.

The gateway may store mappings of the common names to the alias names and/or the alias names to IP addresses corresponding to the data centers. The gateway may determine the preferred data center and the backup data center based on the values of the first common name 204, the second common name 206, and the stored mappings. The gateway may determine with which of the preferred data center or the backup data center a connection is to be established based on the state of the preferred data center and/or the state of the backup data center. For example, the gateway may determine that the connection is to be established between the customer device and the preferred data center based on the preferred data center being available. Further, the gateway may determine that the connection is to be established between the customer device and the backup data center based on the preferred data center being unavailable. The gateway may establish the determined connection for the customer device to allow the customer device to utilize the services of the CSP.

Figure 3:
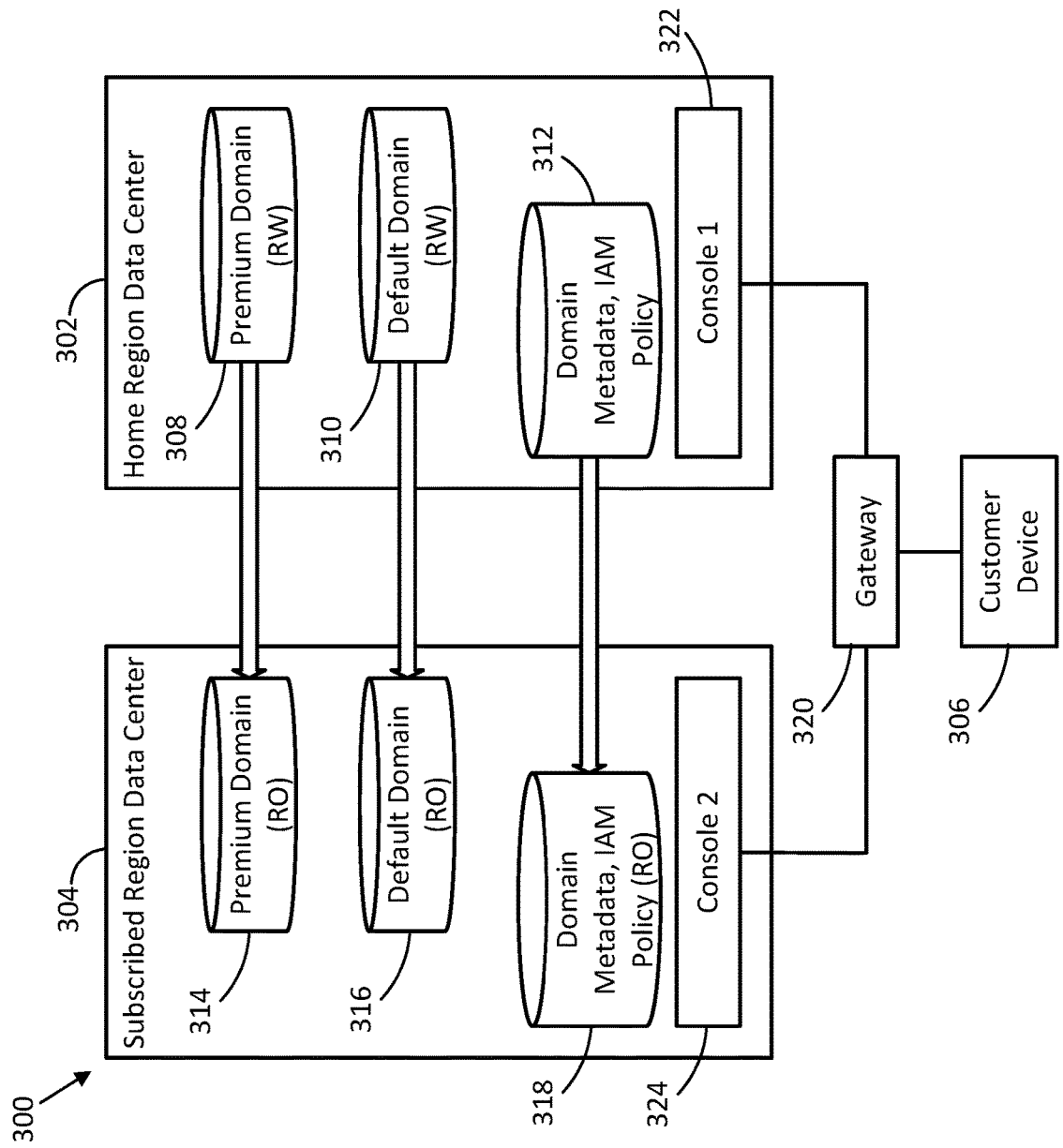
FIG. 3 illustrates an example CSP arrangement, according to at least one embodiment.

FIG. 3 illustrates an example CSP arrangement 300, according to at least one embodiment. For example, the CSP arrangement 300 may illustrate a portion of a CSP that can implement approaches for automated fail over described herein.

The CSP arrangement 300 may include a first data center 302. The first data center 302 may be part of a CSP. The first data center 302 may include one or more of the features of the first data center 104 (FIG. 1). For example, the first data center 302 may include computer hardware and/or software that provide services that can be utilized by customers. The first data center 302 may be located in a first geographic region.

The CSP arrangement 300 may include a second data center 304. The second data center 304 may be a part of the CSP. The second data center 304 may include one or more of the features of the second data center 106 (FIG. 1). For example, the second data center 304 may include computer hardware and/or software that provide services that can be utilized by customers. The second data center 304 may be located in a second geographic region.

The CSP arrangement 300 may include a customer device 306. The customer device 306 may be a computer device that can be operated by a customer of the CSP to access the CSP. The customer device 306 may include one or more of the features of the customer device 108 (FIG. 1).

The customer operating the customer device 306 may be subscribed to one or more data centers of the CSP. For example, the customer is subscribed to the first data center 302 and the second data center 304 in the illustrated embodiment. The CSP may maintain an account for the customer that may indicate the regions to which the customer is subscribed and/or services that may be accessed by the customer.

The CSP may establish one or more domains for the customer on one or more of the data centers of the CSP. In some instances, one or more of the domains for a customer may be replicated among data centers and may provide access to the domains in the data centers to which the domains are replicated. The replicated copies of the domains may have limited functionality as compared to the original copy of the domain, such as the original copy of the domain allowing read and write operations while the replicated copies are limited to read operations.

For example, the first data center 302 stores a first copy of a premium domain 308 and a first copy of a default domain 310 associated with the customer in the illustrated embodiment. Further, the first data center 302 stores a first copy of domain metadata and identity and access management (IAM) policy 312 associated with the customer in the illustrated embodiment. The first data center 302 may be defined as a home region for the domains of the customer. Defining the first data center 302 as the home region may cause the copies of the domains stored in the first data center 302 to be the originals from which copies of the domain in other data centers are replicated. Further, the copies of the domains stored in the home region for the customer may provide read operation and write operation capabilities to the customer, such that the customer can cause read and write operations to be implemented to the copies of the domains stored in the home region. Accordingly, the first copy of the premium domain 308, the first copy of the default domain 310, and the first copy of the domain metadata and IAM policy 312 are original copies of the domains. The customer can cause read and/or write operations to be implemented to the first copy of the premium domain 308, the first copy of the default domain 310, and/or the first copy of the domain metadata and IAM policy 312. The data center defined as the home region may be referred to as the home region data center.

The customer may subscribe to additional data centers of the CSP in addition to the home region data center. The additional data centers to which the customer is subscribed may be referred to as subscribed region data centers. The customer and/or the CSP may define one or more of the domains stored in the home region data center to be replicated in one or more of the subscribed region data centers. The copies of the domains replicated in the subscribed region data centers may provide read only operation to the customer, where the customer can have read operations implemented to the replicated copies of the domain while being prevented from having write operations implemented to the replicated copies of the domain.

In the illustrated embodiment, the customer is subscribed to the second data center 304. The customer and/or the CSP have defined the domains from the first data center 302 to be replicated to the second data center 304. For example, the first copy of the premium domain 308 is replicated to a second copy of the premium domain 314, the first copy of the default domain 310 is replicated to a second copy of the default domain 316, and the first copy of the domain metadata and IAM policy 312 is replicated to a second copy of the domain metadata and IAM policy 318. Each of the second copy of the premium domain 314, the second copy of the default domain 316, and the second copy of the domain metadata and IAM policy 318 may be read only to the customer.

The CSP arrangement 300 may include a gateway 320. The gateway 320 may include one or more of the features of the gateway 114 (FIG. 1). The gateway 320 may be coupled to the customer device 306, the first data center 302, and the second data center 304. The gateway 320 may establish connections between the customer device 306 and the first data center 302 or the customer device 306 and the second data center 304 based on requests from the customer device 306. For example, the customer device 306 may request a connection with a data center, where the request may include an address, such as the address 202 (FIG. 2). The gateway 320 may determine to establish a connection between the customer device 306 and one of the data centers based on the address provided by the customer device 306. Each of the data centers may include a console to which the gateway 320 may connect to establish a connection between the customer device 306 and the data center. For example, the first data center 302 includes a first console 322 to which the gateway 320 can establish a connection for accessing the services of the first data center 302. The second data center 304 includes a second console 324 to which the gateway 320 can establish a connection for accessing the services of the second data center 304.

During operation, the customer device 306 may request a connection with a data center of the CSP. The request provided by the customer device 306 may include an address that maps to a plurality of alias names (such as the address 202), where each of the alias names maps to a corresponding data center. For example, the address includes a first common name (such as the first common name 204 (FIG. 2)) that maps to a first alias name and a second common name (such as the second common name 206 (FIG. 2)) that maps to a second alias name in the illustrated embodiment. The first alias name may map to the first data center 302 and the second alias name may map to the second data center 304.

The gateway 320 may receive the request with the address from the customer device 306. In some embodiments, the gateway 320 may determine with which of the data centers to establish the connection for the customer device based on the address and states of the data centers. For example, the gateway 320 may determine a preferred data center for accessing a domain and one or more backup data centers for accessing the domain from the address. In the illustrated embodiment, the gateway 320 determines that the first common name corresponds to the preferred data center for a domain and the second common name corresponds to the backup data center for the domain based on the locations of the common names within the address. Based on the first common name corresponding to the first data center 302 and the first common name corresponding to the preferred data center, the gateway 320 determines that the first data center 302 is the preferred data center for the domain. Based on the second common name corresponding to the second data center 304 and the second common name corresponding to the backup data center, the gateway 320 determines that the second data center 304 is a backup data center for the domain.

Based on the request, the gateway 320 may determine the states of the first data center 302 and the second data center 304. For example, the gateway 320 determines whether the first data center 302 is available and the second data center 304 is available. In the illustrated embodiment, the gateway 320 determines that both the first data center 302 and the second data center 304 are available. Accordingly, the gateway 320 determines that the preferred data center is available. The gateway 320 determines that the that the address is to be mapped to the first data center 302 based on the first data center 302 being available and the first data center 302 being the preferred data center. The gateway 320 establishes a connection between the customer device 306 and the first data center 302 based on the request.

Once a connection has been established with the first data center 302, the customer device 306 may have access to the domains stored in the first data center 302. For example, the customer device 306 can request write operations and/or read operations to be performed with the first copy of the premium domain 308, the first copy of the default domain 310, and/or the first copy of the domain metadata and IAM policy 312.

Figure 4:
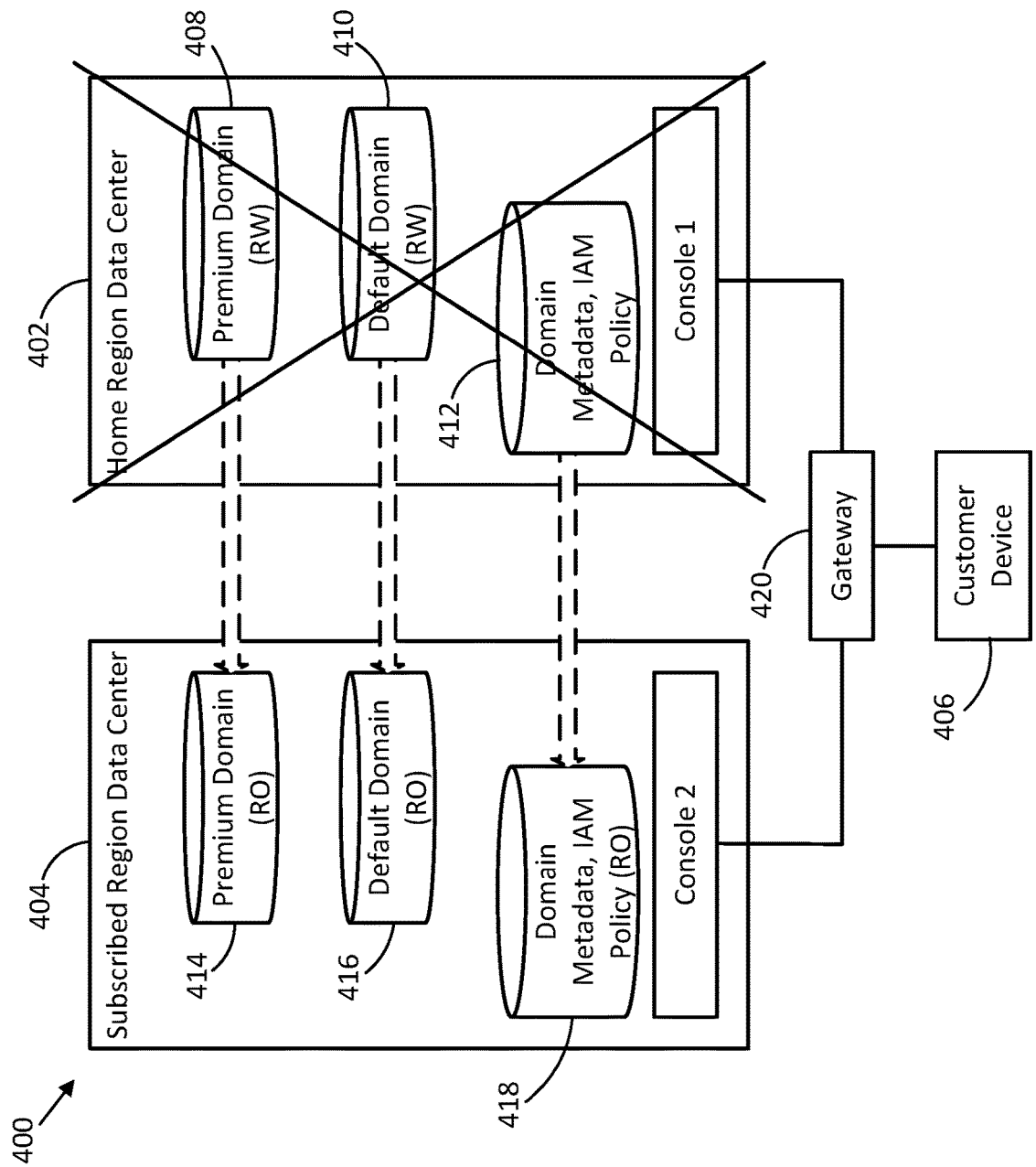
FIG. 4 illustrates an example CSP arrangement with one or more data regions unavailable, according to at least one embodiment.

FIG. 4 illustrates an example CSP arrangement 400 with one or more data regions unavailable, according to at least one embodiment. The CSP arrangement 400 may include one or more of the features of the CSP arrangement 300 (FIG. 3). In particular, the CSP arrangement 400 may include the elements of the CSP arrangement 300 with one or more of the elements in a different state than the states described in relation to the CSP arrangement 300.

The CSP arrangement 400 may include a CSP with a first data center 402 and a second data center 404. The first data center 402 may include one or more of the features of the first data center 302 (FIG. 3). The second data center 404 may include one or more of the features of the second data center 304 (FIG. 3).

The CSP arrangement 400 may include a customer device 406. The customer device 406 may include one or more of the features of the customer device 306 (FIG. 3). The customer device 406 may be operated by the same customer that operates the customer device 306. Accordingly, the customer may be associated with the same account as described in relation to the customer device 306 and may be subscribed to the first data center 402 and the second data center 404.

The first data center 402 may store one or more domains associated with the customer. The first data center 402 may store a first copy of a premium domain 408, a first copy of a default domain 410, and a first copy of a domain metadata and IAM policy 412. The first copy of the premium domain 408 may include one or more of the features of the first copy of the premium domain 308 (FIG. 3). The first copy of the default domain 410 may include one or more of the features of the first copy of the default domain 310 (FIG. 3). The first copy of the domain metadata and IAM policy 412 may include one or more of the features of the domain metadata and IAM policy 312 (FIG. 3).

The second data center 404 may store one or more domains associated with the customer. One or more of the domains stored by the second data center 404 may be replicated domains of the domains stored by the first data center 402. The second data center 404 may store a second copy of the premium domain 414, a second copy of the default domain 416, and a second copy of the domain metadata and IAM policy 418. The second copy of the premium domain 414 may be replicated from the first copy of the premium domain 480. The second copy of the default domain 416 may be replicated from the first copy of the default domain 410. The second copy of the domain metadata and IAM policy 418 may be replicated from the first copy of the domain metadata and IAM policy 412.

The CSP arrangement 400 may include a gateway 420. The gateway 420 may include one or more of the features of the gateway 320 (FIG. 3). The gateway 420 may be coupled to the customer device 406, the first data center 402, and the second data center 404. The gateway 420 may establish connections between the customer device 406 and the first data center 402, and/or between the customer device 406 and the second data center 404.

In the illustrated embodiment, the first data center 402 is unavailable (as indicated by the 'X' through the first data center 402). In some instances, the gateway 420 may have previously established a connection between the customer device 406 and the first data center 402. The gateway 420 may have established the connection based on an address that included a first common name corresponding to the first data center 402 and a second common name corresponding to the second data center 404, as described in relation to FIG. 3. The address may indicate the first data center 402 as the preferred data center for the domains and the second data center 404 as the backup data center for the domains. The gateway 420 may have maintained the connection until the first data center 402 became unavailable. The connection may have been terminated based on the first data center 402 becoming unavailable.

The gateway 420 may determine that the first data center 402 had become unavailable while the connection existed between the customer device 406 and the first data center 402. The gateway 420 may determine that the connection was improperly terminated based on the first data center 402 becoming unavailable. The gateway 420 may determine that a connection is to be established between the customer device 406 and the backup data center for the domains to which the customer device 406 was connected prior to the first data center 402 becoming unavailable. In some embodiments, the CSP may cause a query to be displayed on the customer device 406 to determine whether a connection to be established between the customer device 406 and the backup data center for the domains, where the CSP may determine whether the connection is to be established based on a response of the customer operating the customer device 406 to the query. In some embodiments, the CSP may wait for a predetermined period of time from the determination that the first data center 402 has become unavailable to determine to establish the connection with the backup center or cause the query to be displayed on the customer device 406.

In response to the gateway 420 determining that a connection is to be established between the customer device 406 and the backup data center, the gateway 420 may determine the backup data center. The gateway 420 may determine the backup data center based on the address utilized for establishing the connection with the first data center 402. For example, the gateway 420 may have stored the address received in the request or the gateway 420 may request the address from the customer device 406 in response to the determination that the first data center 402 became unavailable. The gateway 420 may determine that the second data center 404 is the backup data center based on the second common name from the address corresponding to the second data center 404.

The gateway 420 may establish the connection between the second data center 404 and the customer device 406 based on the determination that the second data center 404 is the backup data center for the domains of the customer. Once the connection has been established between the second data center 404 and the customer device 406, the customer device 406 may access the second copy of the premium domain 414, the second copy of the default domain 416, and the second copy of the domain metadata and IAM policy 418 stored by the second data center 404. Due to the second data center 404 being the backup data center rather than being defined as the home region, the operations that the customer device 406 can have implemented with the domains stored by the second data center 404 may be limited. For example, the customer device 406 may be limited to having read operations implemented for the second copy of the premium domain 414, the second copy of the default domain 416, and the second copy of the domain metadata and IAM policy 418, where the customer device 406 may be prevented from having write operations implemented with the domains stored by the second data center 404.

In other instances, the gateway 420 may receive the request to connect with the CSP with the address while the first data center 402 is unavailable. In this instance, the gateway 420 may determine the preferred data center based on the address. For example, the gateway 420 may determine that the first common name of the address corresponds to the preferred data center and indicates the first data center 402. Accordingly, the gateway 420 may determine that the first data center 402 is the preferred data center based on the address.

The gateway 420 may determine that the first data center 402 is unavailable. In some embodiments, the gateway 420 may attempt to establish a connection between the customer device 406 and the first data center 402. The gateway 420 may determine that the first data center 402 has not responded to attempts to establish the connection and may determine that the first data center 402 is unavailable based on the lack of response from the first data center 402. In other embodiments, the CSP may update the gateway 420 based on the availability of the data centers and the gateway 420 may determine that the first data center 402 is unavailable based on the indicated availability of the data centers.

Based on the determination that the preferred data center is unavailable, the gateway 420 may determine that a connection is to be established with the backup data center. In some embodiments, the CSP may cause a query to be displayed on the customer device 406 that queries whether a connection is to be established with the backup data center. The gateway 420 may determine whether a connection is to be established with the backup data center based on a customer response to the query.

Based on the determination that a connection is to be established with the backup data center, the gateway 420 may determine the backup data center for the domains of the customer based on the address. For example, the gateway 420 may identify the second common name from the address and determine that the second common name indicates the backup data center. In the illustrated embodiment, the second common name corresponds to the second data center 404 and indicates that the second data center 404 is the backup data center for the domains for the customer.

The gateway 420 may establish the connection between the second data center 404 and the customer device 406 based on the determination that the second data center 404 is the backup data center for the domains of the customer. Once the connection has been established between the second data center 404 and the customer device 406, the customer device 406 may access the second copy of the premium domain 414, the second copy of the default domain 416, and the second copy of the domain metadata and IAM policy 418 stored by the second data center 404. Due to the second data center 404 being the backup data center rather than being defined as the home region, the operations that the customer device 406 can have implemented with the domains stored by the second data center 404 may be limited. For example, the customer device 406 may be limited to having read operations implemented for the second copy of the premium domain 414, the second copy of the default domain 416, and the second copy of the domain metadata and IAM policy 418, where the customer device 406 may be prevented from having write operations implemented with the domains stored by the second data center 404.

The connection with the backup data center for the customer being established based on the preferred data center becoming unavailable and the address may provide for a faster failover of the domains than legacy approaches. Additionally, utilization of the address that indicates the preferred data centers and one or more backup data centers may be simpler to update the connections than individually having to update the connections for each customer.

Figure 5:
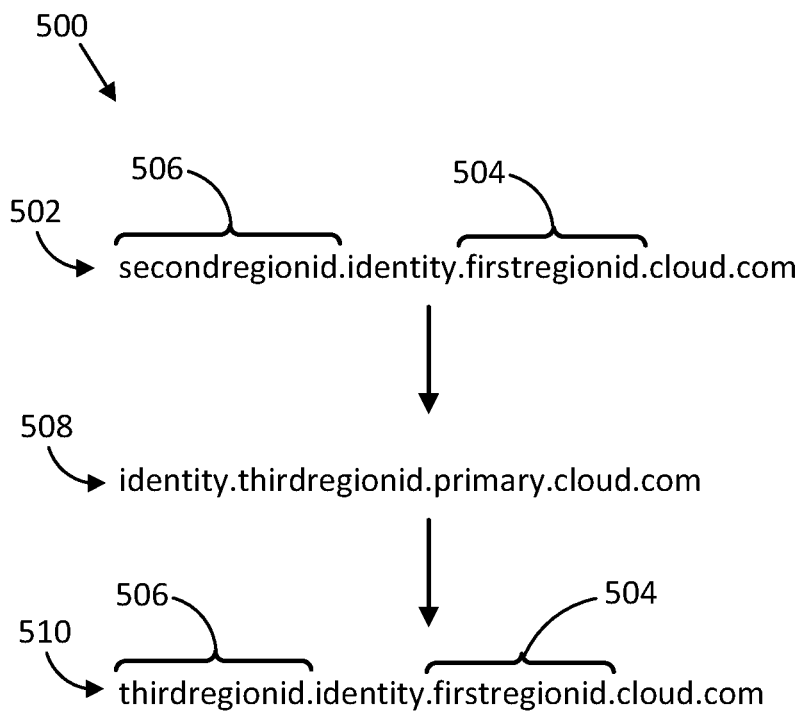
FIG. 5 illustrates an example address update arrangement, according to at least one embodiment.

FIG. 5 illustrates an example address update arrangement 500, according to at least one embodiment. In some embodiments, the preferred data center and backup data centers indicated by an address may be defined, at least initially, based on data centers with which a customer subscribes. In some embodiments, the customer and/or the CSP may be able to update the preferred data center and/or the backup data centers. An address to be utilized by the customer to access the CSP may be updated based on the changes to the preferred data center and/or the backup data centers.

The address update arrangement 500 may include a first address 502. The first address 502 may be an address to be utilized by a customer for accessing a CSP (such as the CSP 102 (FIG. 1), the CSP described in relation to FIG. 3, and/or the CSP described in relation to FIG. 4. The first address 502 may include one or more of the features of the address 202 (FIG. 2). The first address 502 may include a first common name 504 and a second common name 506.

The first common name 504 may correspond to a preferred data center for the customer. In the illustrated embodiment, the first common name 504 has a value of firstregionid. The value of the first common name 504 may be mapped to a first alias name. The first alias name may map to a first data center, such as the first data center 302 (FIG. 3) and/or the first data center 402 (FIG. 1). The first common name 504 may indicate that the first data center is the preferred data center for the domains of the customer.

The second common name 506 may correspond to a backup data center for the customer. In the illustrated embodiment, the second common name 506 has a value of secondregionid. The value of the second common name 506 may be mapped to a second alias name. The second alias name may map to a second data center, such as the second data center 304 (FIG. 3) and/or the second data center 404 (FIG. 4). The second common name 506 may indicate that the second data center is the backup data center for the domains of the customer.

The customer and/or the CSP may request that the preferred data center and/or one or more of the backup data centers for the customer be changed. In the illustrated embodiment, the customer and/or the CSP may request that the backup data center be changed to a third data center. The CSP update arrangement 500 may include an alias name 508 that corresponds to the third data center.

The CSP may update the address based on the alias name 508 that corresponds to the third data center and/or the third data center. For example, the CSP may update the first address 502 to a second address 510. For example, the CSP may update the value of the second common name 506 from the value corresponding to the second data center to a value corresponding to the third data center and/or the alias name 508 corresponding to the third data center. In particular, the CSP may update the second common name 506 to the value of thirdregionid, which corresponds to the third data center.

A gateway (such as the gateway 320 (FIG. 3) and/or the gateway 420 (FIG. 4)) may determine the data centers that are the preferred data center and/or the backup data centers for a customer based on the address provided. In the case of the first address 502, the gateway may determine that the first data center is the preferred data center based on the value of the first common name 504 and that the second data center is the backup data center based on the value of the second common name 506. In the case of the second address 510 after the update, the gateway may determine that the first data center is the preferred data center based on the value of the first common name 504 and that the third data center is the backup data center based on the value of the second common name 506.

Figure 6:
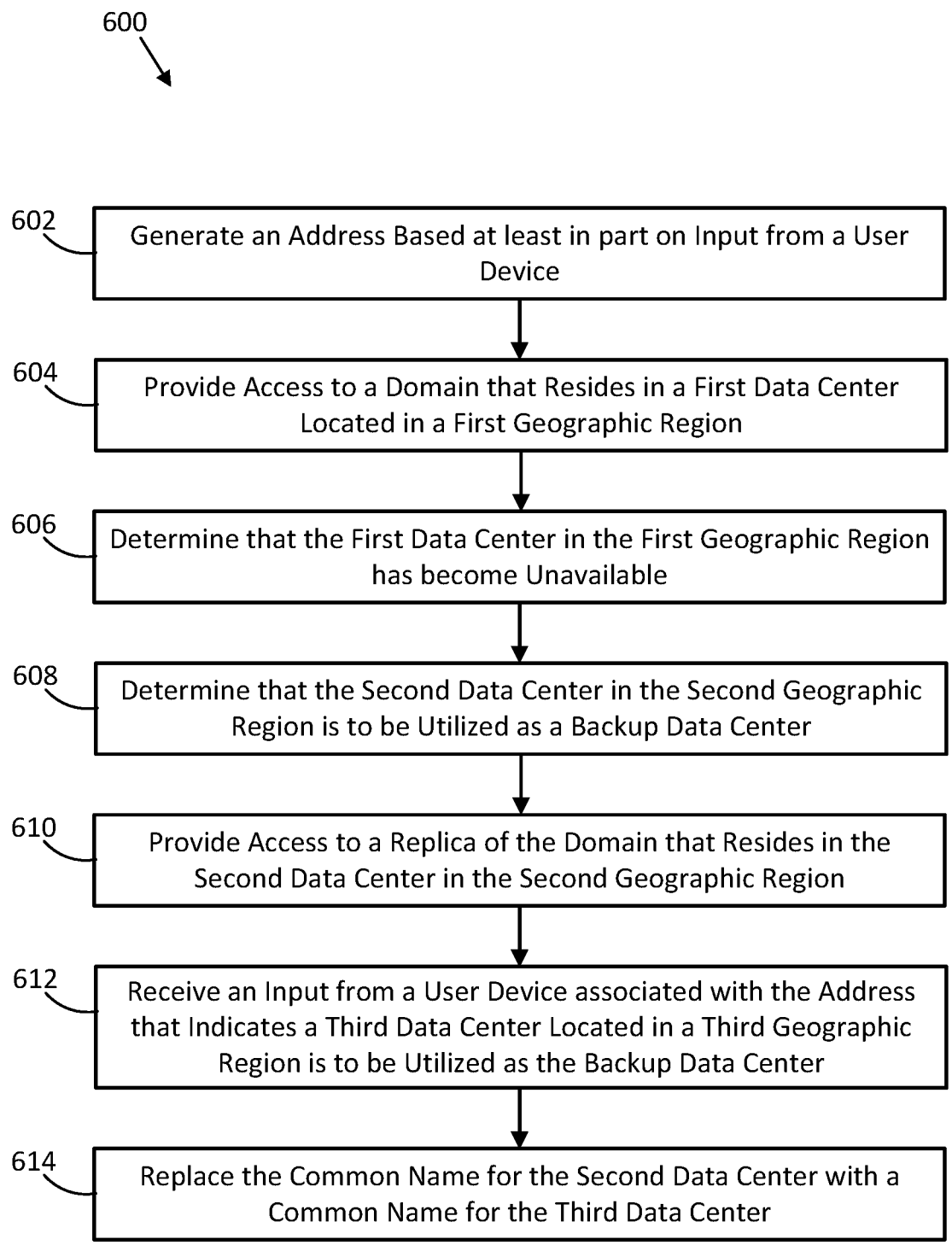
FIG. 6 illustrates an example procedure related to data center access, according to at least one embodiment.

FIG. 6 illustrates an example procedure 600 related to data center access, according to at least one embodiment. In particular, the procedure 600 may utilize an address with multiple common names for providing access to a data center. The procedure 600 may be performed by a CSP (such as the CSP 102 (FIG. 1), the CSP described in relation to FIG. 3, and/or the CSP described in relation to FIG. 4).

In 602, the CSP may generate an address based at least in part on input from a user device. The input may indicate that a second data center located in a second geographic region is to be utilized as a backup data center for a domain. In some embodiments, generating the address may comprise including a common name corresponding to the second data center located in the second geographic region in the address based at least in part on the input indicating that the second data center located in the second geographic region is to be utilized as the backup data center for the domain. In some embodiments, 602 may be omitted.

In 604, the CSP may provide access to a domain that resides in a first data center located in a first geographic region. For example, the CSP may provide access to the domain that resides in the first data center located in the first geographic region based at least in part on an address that indicates the first data center located in the first geographic region and a second data center located in a second geographic region. In some embodiments, the address may be a domain name system (DNS) address.

In some embodiments, the address may include a first common name that indicates the first data center located in the first geographic region and a second common name that indicates the second data center located in the second geographic region. In some of these embodiments, the first common name may be associated with a first alias name. The first alias name may indicate a regional IP address for access of the domain that resides in the first data center located in the first geographic region. Further, the second common name may be associated with a second alias name. The second alias name may indicate a regional IP address for access of the replica of the domain that resides in the second data center located in the second geographic region.

In some embodiments, the address may include a common name for the second data center located in the second geographic region that indicates that the second data center located in the second geographic region is to be utilized as the backup data center for the domain.

In 606, the CSP may determine that the first data center in the first geographic region has become unavailable. The CSP may determine that the first data center in the first geographic region has become available while access to the domain that resides in the first data center is being provided.

In 608, the CSP may determine that the second data center in the second geographic region is to be utilized as a backup data center. For example, the CSP may determine that the second data center in the second geographic region is to be utilized as a backup data center for the domain based at least in part on the address.

In 610, the CSP may provide access to a replica of the domain that resides in the second data center in the second geographic region. For example, the CSP may provide access to the replica of the domain based at least in part on the determination that the second data center in the second geographic region is to be utilized as the backup data center and/or the determination that the first data center in the first geographic region has become unavailable. In some embodiments, the replica of the domain may be a copy of the domain replicated from the first data center.

In 612, the CSP may receive an input from a user device associated with the address that indicates a third data center located in a third geographic region is to be utilized as the backup data center. For example, the input may indicate that the third geographic region is to be utilized as the backup data center for the domain.

In 614, the CSP may replace the common name for the second data center with a common name for the third data center. For example, the CSP may replace the common name for the second data center located in the second geographic region within the address with a common name for the third data center located in the third geographic region. The common name for the third data center located in the third geographic region may indicate that the third data center located in the third geographic region is to be utilized as the backup data center for the domain.

While FIG. 6 may arguably suggest an order of the operations of the procedure 600, it should be understood that the order of the operations of the procedure 600 may be different and/or one or more of the operations may be performed concurrently in other embodiments. Further, it should be understood that one or more of the operations may be omitted from and/or one or more additional operations may be included in the procedure 600 in other embodiments.

Example Infrastructure as Service Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 7:
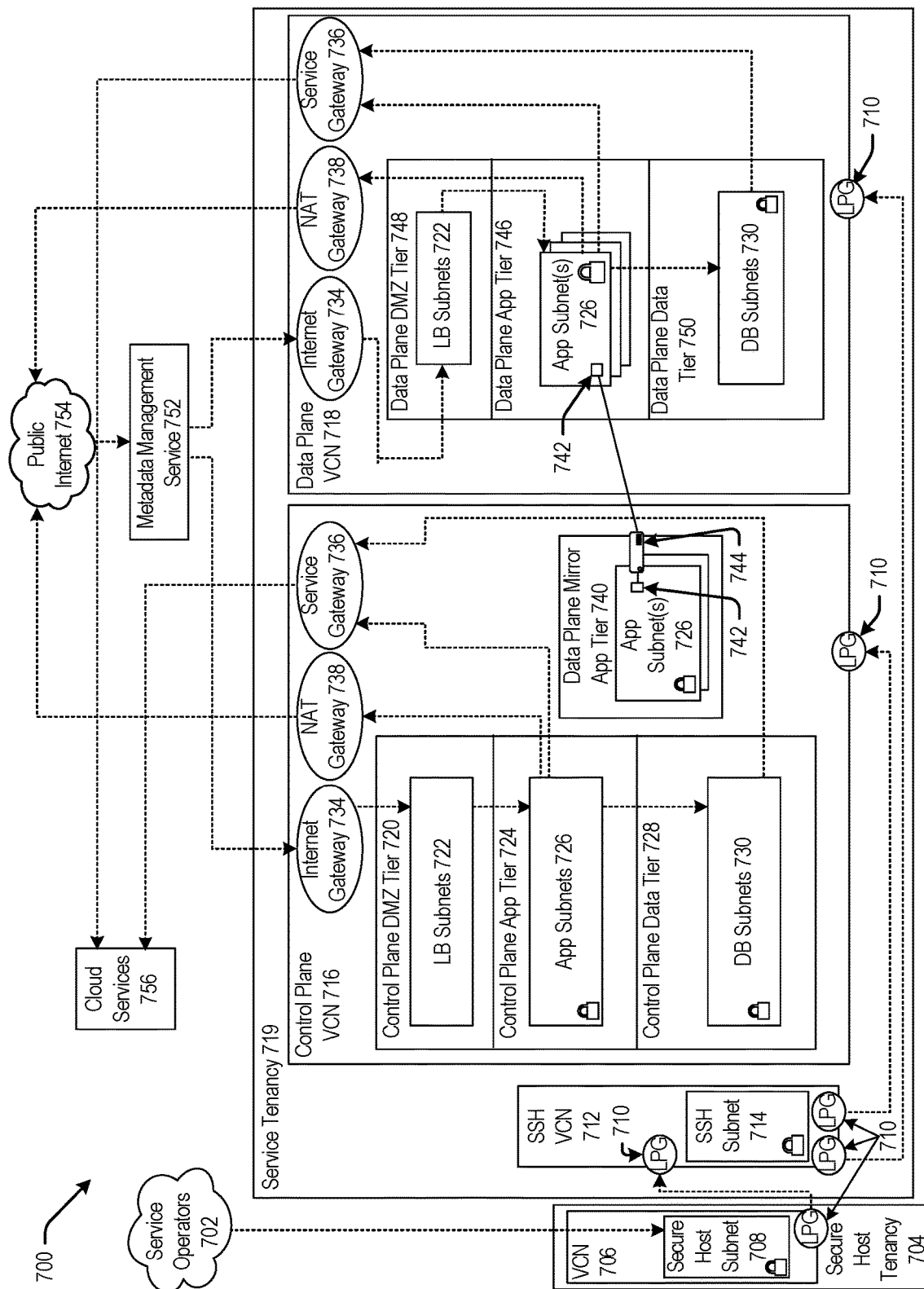
FIG. 7 is a block diagram illustrating one pattern for implementing a cloud infrastructure as a service system, according to at least one embodiment.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively couple to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Metadata that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of threat prevention, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
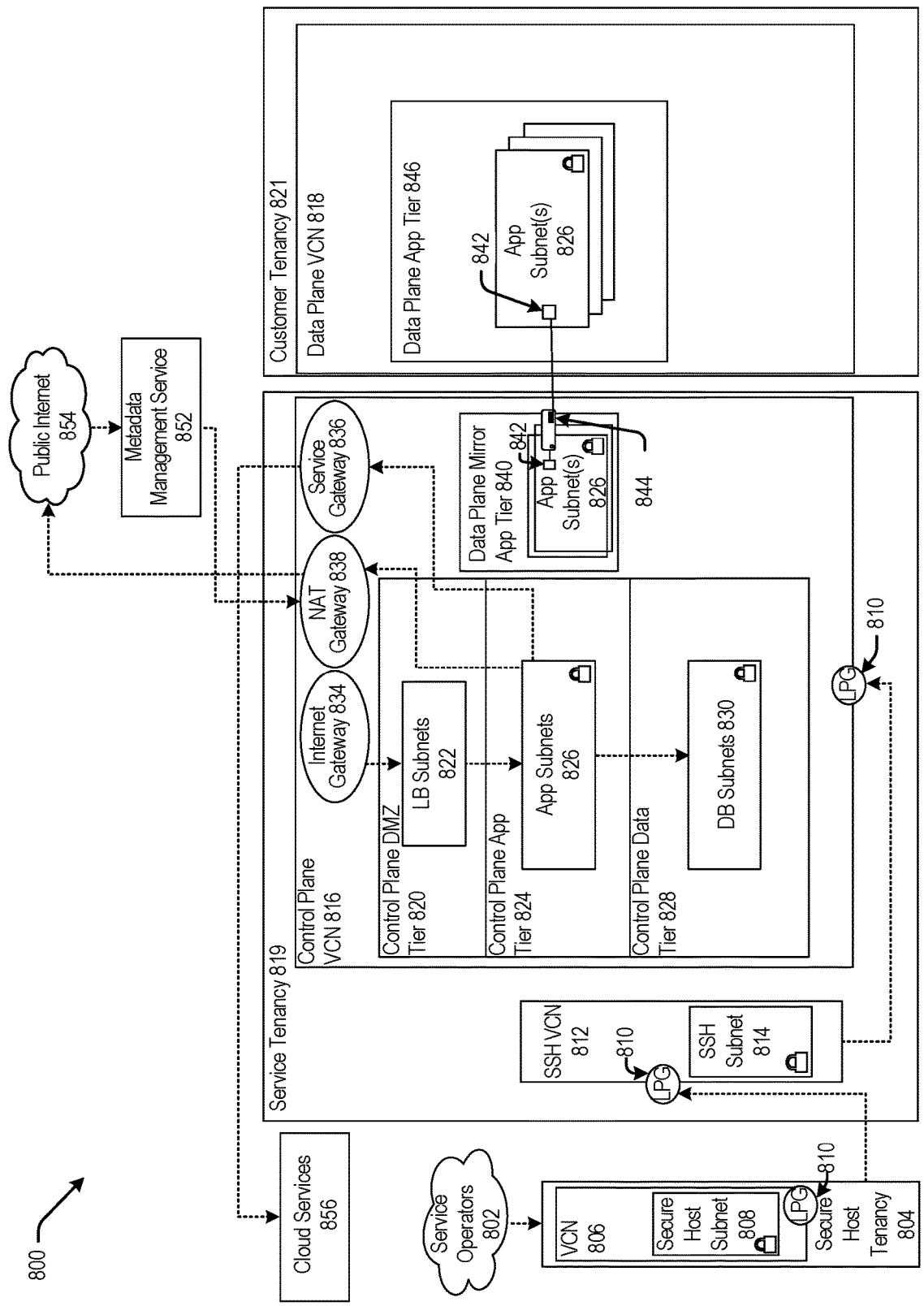
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g., service operators 702 of FIG. 7) can be communicatively coupled to a secure host tenancy 804 (e.g., the secure host tenancy 704 of FIG. 7) that can include a virtual cloud network (VCN) 806 (e.g., the VCN 706 of FIG. 7) and a secure host subnet 808 (e.g., the secure host subnet 708 of FIG. 7). The VCN 806 can include a local peering gateway (LPG) 810 (e.g., the LPG 710 of FIG. 7) that can be communicatively coupled to a secure shell (SSH) VCN 812 (e.g., the SSH VCN 712 of FIG. 7) via an LPG 710 contained in the SSH VCN 812. The SSH VCN 812 can include an SSH subnet 814 (e.g., the SSH subnet 714 of FIG. 7), and the SSH VCN 812 can be communicatively coupled to a control plane VCN 816 (e.g., the control plane VCN 716 of FIG. 7) via an LPG 810 contained in the control plane VCN 816. The control plane VCN 816 can be contained in a service tenancy 819 (e.g., the service tenancy 719 of FIG. 7), and the data plane VCN 818 (e.g., the data plane VCN 718 of FIG. 7) can be contained in a customer tenancy 821 that may be owned or operated by users, or customers, of the system.

The control plane VCN 816 can include a control plane DMZ tier 820 (e.g., the control plane DMZ tier 720 of FIG. 7) that can include LB subnet(s) 822 (e.g., LB subnet(s) 722 of FIG. 7), a control plane app tier 824 (e.g., the control plane app tier 724 of FIG. 7) that can include app subnet(s) 826 (e.g., app subnet(s) 726 of FIG. 7), a control plane data tier 828 (e.g., the control plane data tier 728 of FIG. 7) that can include database (DB) subnet(s) 830 (e.g., similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g., the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g., the service gateway 736 of FIG. 7) and a network address translation (NAT) gateway 838 (e.g., the NAT gateway 738 of FIG. 7). The control plane VCN 816 can include the service gateway 836 and the NAT gateway 838.

The control plane VCN 816 can include a data plane mirror app tier 840 (e.g., the data plane mirror app tier 740 of FIG. 7) that can include app subnet(s) 826. The app subnet(s) 826 contained in the data plane mirror app tier 840 can include a virtual network interface controller (VNIC) 842 (e.g., the VNIC of 742) that can execute a compute instance 844 (e.g., similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g., the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g., the metadata management service 752 of FIG. 7) that can be communicatively coupled to public Internet 854 (e.g., public Internet 754 of FIG. 7). Public Internet 854 can be communicatively coupled to the NAT gateway 838 contained in the control plane VCN 816. The service gateway 836 contained in the control plane VCN 816 can be communicatively couple to cloud services 856 (e.g., cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 7," may be located in Region 1 and in "Region 2." If a call to Deployment 7 is made by the service gateway 836 contained in the control plane VCN 816 located in Region 1, the call may be transmitted to Deployment 7 in Region 1. In this example, the control plane VCN 816, or Deployment 7 in Region 1, may not be communicatively coupled to, or otherwise in communication with, Deployment 7 in Region 2.

Figure 9:
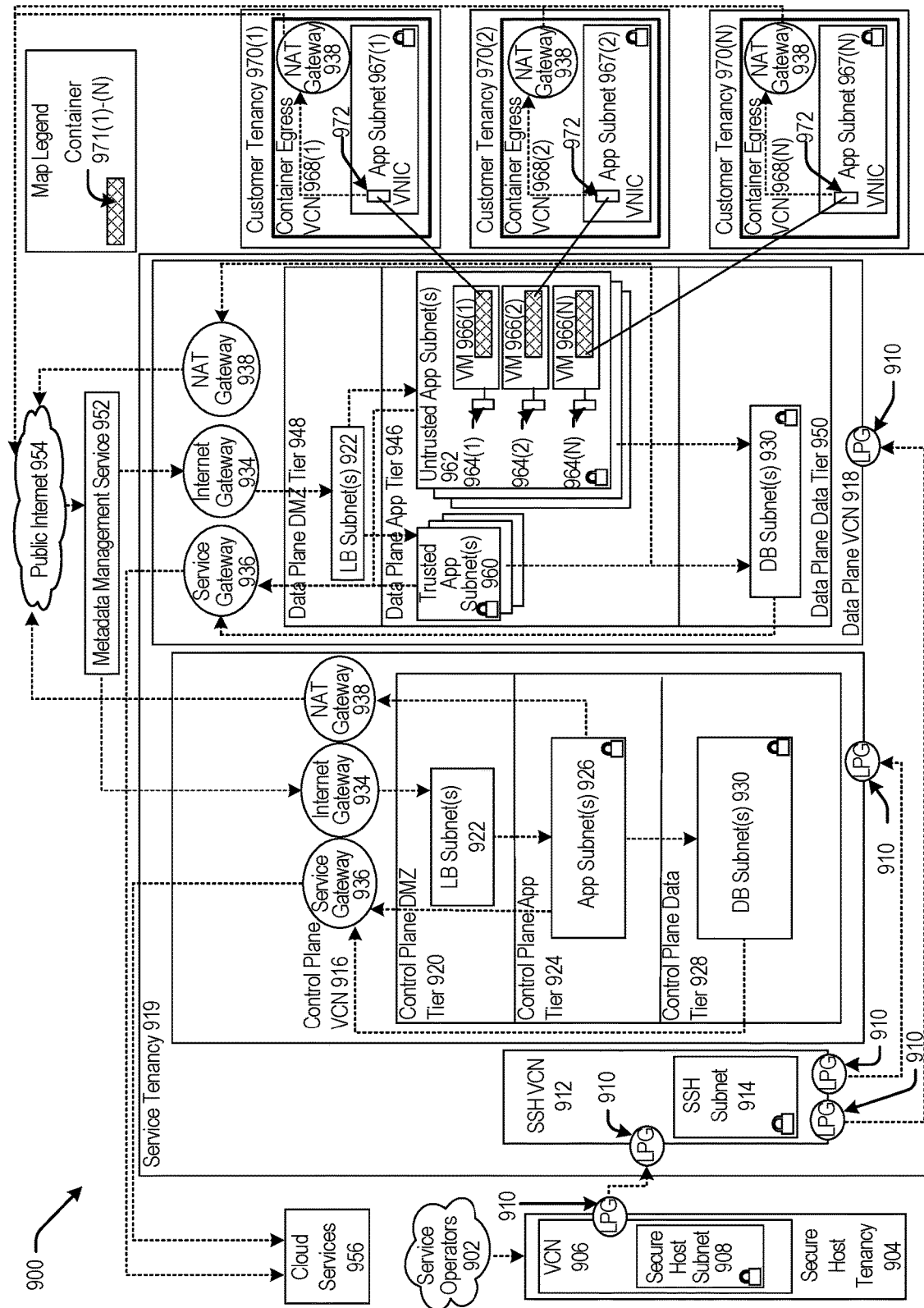
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 702 of FIG. 7) can be communicatively coupled to a secure host tenancy 904 (e.g., the secure host tenancy 704 of FIG. 7) that can include a virtual cloud network (VCN) 906 (e.g., the VCN 706 of FIG. 7) and a secure host subnet 908 (e.g., the secure host subnet 708 of FIG. 7). The VCN 906 can include an LPG 910 (e.g., the LPG 710 of FIG. 7) that can be communicatively coupled to an SSH VCN 912 (e.g., the SSH VCN 712 of FIG. 7) via an LPG 910 contained in the SSH VCN 912. The SSH VCN 912 can include an SSH subnet 914 (e.g., the SSH subnet 714 of FIG. 7), and the SSH VCN 912 can be communicatively coupled to a control plane VCN 916 (e.g., the control plane VCN 716 of FIG. 7) via an LPG 910 contained in the control plane VCN 916 and to a data plane VCN 918 (e.g., the data plane 718 of FIG. 7) via an LPG 910 contained in the data plane VCN 918. The control plane VCN 916 and the data plane VCN 918 can be contained in a service tenancy 919 (e.g., the service tenancy 719 of FIG. 7).

The control plane VCN 916 can include a control plane DMZ tier 920 (e.g., the control plane DMZ tier 720 of FIG. 7) that can include load balancer (LB) subnet(s) 922 (e.g., LB subnet(s) 722 of FIG. 7), a control plane app tier 924 (e.g., the control plane app tier 724 of FIG. 7) that can include app subnet(s) 926 (e.g., similar to app subnet(s) 726 of FIG. 7), a control plane data tier 928 (e.g., the control plane data tier 728 of FIG. 7) that can include DB subnet(s)

930. The LB subnet(s) 922 contained in the control plane DMZ tier 920 can be communicatively coupled to the app subnet(s) 926 contained in the control plane app tier 924 and to an Internet gateway 934 (e.g., the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g., the service gateway of FIG. 7) and a network address translation (NAT) gateway 938 (e.g., the NAT gateway 738 of FIG. 7). The control plane VCN 916 can include the service gateway 936 and the NAT gateway 938.

The data plane VCN 918 can include a data plane app tier 946 (e.g., the data plane app tier 746 of FIG. 7), a data plane DMZ tier 948 (e.g., the data plane DMZ tier 748 of FIG. 7), and a data plane data tier 950 (e.g., the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g., public Internet 754 of FIG. 7).

The Internet gateway 934 contained in the control plane VCN 916 and contained in the data plane VCN 918 can be communicatively coupled to a metadata management service 952 (e.g., the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
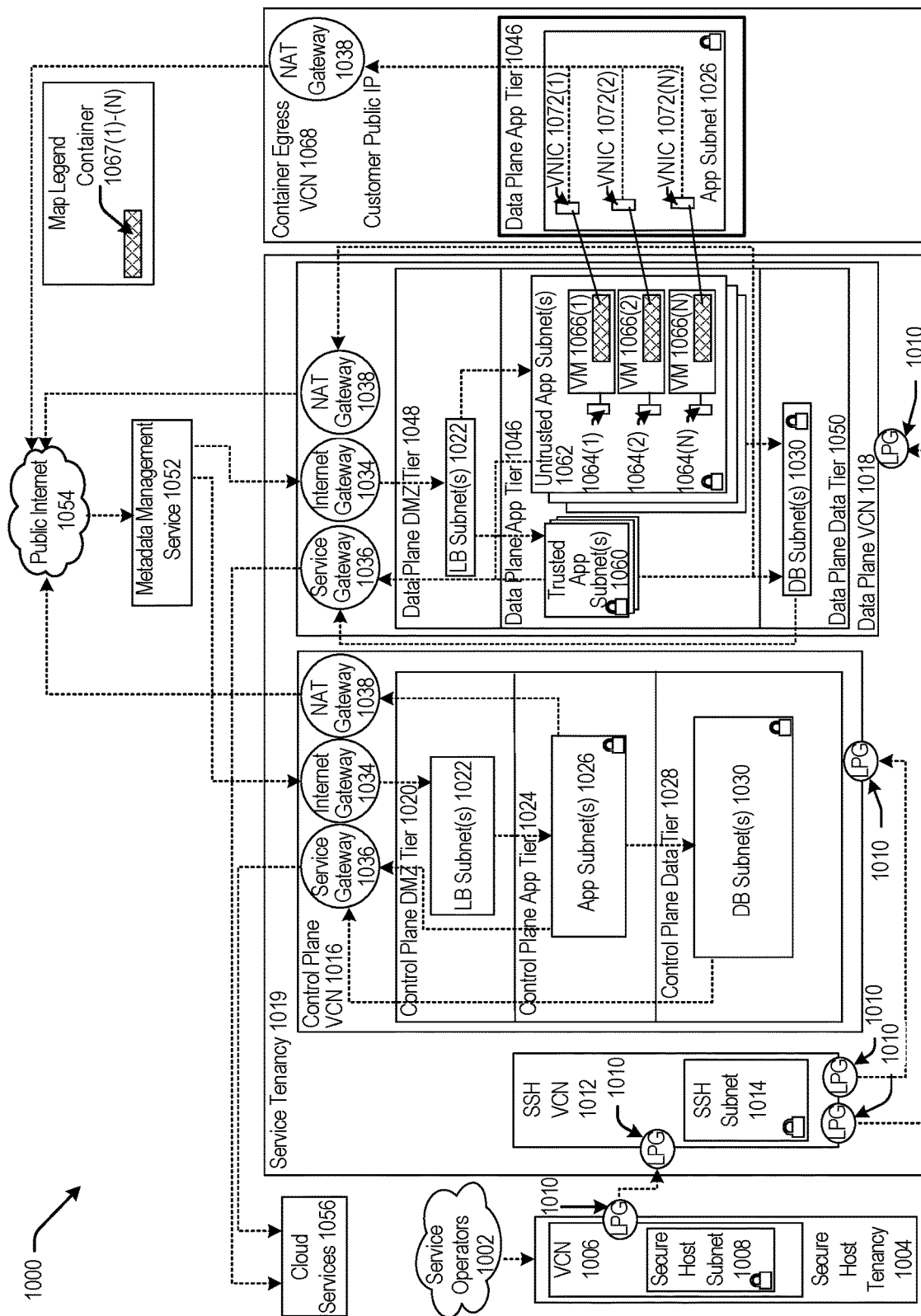
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 702 of FIG. 7) can be communicatively coupled to a secure host tenancy 1004 (e.g., the secure host tenancy 704 of FIG. 7) that can include a virtual cloud network (VCN) 1006 (e.g., the VCN 706 of FIG. 7) and a secure host subnet 1008 (e.g., the secure host subnet 708 of FIG. 7). The VCN 1006 can include an LPG 1010 (e.g., the LPG 710 of FIG. 7) that can be communicatively coupled to an SSH VCN 1012 (e.g., the SSH VCN 712 of FIG. 7) via an LPG 1010 contained in the SSH VCN 1012. The SSH VCN 1012 can include an SSH subnet 1014 (e.g., the SSH subnet 714 of FIG. 7), and the SSH VCN 1012 can be communicatively coupled to a control plane VCN 1016 (e.g., the control plane VCN 716 of FIG. 7) via an LPG 1010 contained in the control plane VCN 1016 and to a data plane VCN 1018 (e.g., the data plane 718 of FIG. 7) via an LPG 1010 contained in the data plane VCN 1018. The control plane VCN 1016 and the data plane VCN 1018 can be contained in a service tenancy 1019 (e.g., the service tenancy 719 of FIG. 7).

The control plane VCN 1016 can include a control plane DMZ tier 1020 (e.g., the control plane DMZ tier 720 of FIG. 7) that can include LB subnet(s) 1022 (e.g., LB subnet(s) 722 of FIG. 7), a control plane app tier 1024 (e.g., the control plane app tier 724 of FIG. 7) that can include app subnet(s) 1026 (e.g., app subnet(s) 726 of FIG. 7), a control plane data tier 1028 (e.g., the control plane data tier 728 of FIG. 7) that can include DB subnet(s) 1030 (e.g., DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 7) and a network address translation (NAT) gateway 1038 (e.g., the NAT gateway 738 of FIG. 7). The control plane VCN 1016 can include the service gateway 1036 and the NAT gateway 1038.

The data plane VCN 1018 can include a data plane app tier 1046 (e.g., the data plane app tier 746 of FIG. 7), a data plane DMZ tier 1048 (e.g., the data plane DMZ tier 748 of FIG. 7), and a data plane data tier 1050 (e.g., the data plane data tier 750 of FIG. 7). The data plane DMZ tier 1048 can include LB subnet(s) 1022 that can be communicatively coupled to trusted app subnet(s) 1060 (e.g., trusted app subnet(s) 960 of FIG. 9) and untrusted app subnet(s) 1062 (e.g., untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g., public Internet 754 of FIG. 7).

The Internet gateway 1034 contained in the control plane VCN 1016 and contained in the data plane VCN 1018 can be communicatively coupled to a metadata management service 1052 (e.g., the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present disclosure.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

EXAMPLES

In the following sections, further exemplary embodiments are provided.

Example 1 may include a method for failover of a domain, comprising providing, by a cloud service provider (CSP), access to a domain that resides in a first data center located in a first geographic region based at least in part on an address that indicates the first data center located in the first geographic region and a second data center located in a second geographic region, determining, by the cloud service provider, that the first data center in the first geographic region has become unavailable, determining, by the cloud service provider, that the second data center in the second geographic region is to be utilized as a backup data center for the domain based at least in part on the address, and providing, by the cloud service provider, access to a replica of the domain that resides in the second data center in the second geographic region based at least in part on a) the determination that the second data center in the second geographic region is to be utilized as the backup data center and b) the determination that the first data center in the first geographic region has become unavailable.

Example 2 may include the method of example 1, wherein the address is a domain name system (DNS) address.

Example 3 may include the method of example 1, wherein the address comprises a first common name that indicates the first data center located in the first geographic region and a second common name that indicates the second data center located in the second geographic region.

Example 4 may include the method of example 3, wherein the first common name is associated with a first alias name, wherein the first alias name indicates a regional Internet protocol (IP) address for access of the domain that resides in the first data center located in the first geographic region, wherein the second common name is associated with a second alias name, and wherein the second alias name indicates a regional Internet protocol address for access of the replica of the domain that resides in the second data center located in the second geographic region.

Example 5 may include the method of example 1, further comprising generating, by the cloud service provider, the address based at least in part on input from a user device, the input indicating that the second data center located in the second geographic region is to be utilized as the backup data center for the domain.

Example 6 may include the method of example 5, wherein generating the address comprises including a common name corresponding to the second data center located in the second geographic region in the address based at least in part on the input indicating that the second data center located in the second geographic region is to be utilized as the backup data center for the domain.

Example 7 may include the method of example 1, wherein the address includes a common name for the second data center located in the second geographic region that indicates that the second data center located in the second geographic region is to be utilized as the backup data center for the domain, wherein the method further comprises receiving, by the cloud service provider, an input from a user device associated with the address that indicates a third data center located in a third geographic region is to be utilized as the backup data center for the domain, and replacing, by the cloud service provider, the common name for the second data center located in the second geographic region within the address with a common name for the third data center located in the third geographic region, wherein the common name for the third data center located in the third geographic region indicates that the third data center located in the third geographic region is to be utilized as the backup data center for the domain.

Example 8 may include one or more non-transitory computer-readable media having instructions stored thereon, wherein the instructions, when executed by one or more processors, cause a cloud service provider (CSP) to provide access to a domain that resides in a first data center located in a first geographic region based at least in part on an address that indicates the first data center located in the first geographic region and a second data center located in a second geographic region, determine that the first data center located in the first geographic region has become unavailable, determine that the second data center located in the second geographic region is to be utilized as a backup data center for the domain based at least in part on the address, and provide access to a replica of the domain that resides in the second data center located in the second geographic region based at least in part on the determination that the second data center located in the second geographic region is to be utilized as the backup data center and the determination that the first data center located in the first geographic region has become unavailable.

Example 9 may include the one or more non-transitory computer-readable media of example 8, wherein the address is a domain name system (DNS) address.

Example 10 may include the one or more non-transitory computer-readable media of example 8, wherein the address comprises a first common name that indicates the first data center located in the first geographic region and a second common name that indicates the second data center located in the second geographic region.

Example 11 may include the one or more non-transitory computer-readable media of example 10, wherein the first common name is associated with a first alias name, wherein the first alias name indicates a regional Internet protocol (IP) address for access of the domain that resides in the first data center located in the first geographic region, wherein the second common name is associated with a second alias name, and wherein the second alias name indicates a regional IP address for access of the replica of the domain that resides in the second data center located in the second geographic region.

Example 12 may include the one or more non-transitory computer-readable media of example 8, wherein the instructions, when executed by the one or more processors, further causes the cloud service provider to generate the address based at least in part on input from a user device, the input indicating that the second data center located in the second geographic region is to be utilized as the backup data center for the domain.

Example 13 may include the one or more non-transitory computer-readable media of example 12, wherein to generate the address comprises to include a common name corresponding to the second data center located in the second geographic region in the address based at least in part on the input indicating that the second data center located in second region is to be utilized as the backup data center for the domain.

Example 14 may include the one or more non-transitory computer-readable media of example 8, wherein the address includes a common name for the second data center located in the second geographic region that indicates that the second data center located in the second geographic region is to be utilized as the backup data center for the domain, wherein the instructions, when executed by the one or more processors, further cause the cloud service provider to receive an input from a user device associated with the address that indicates a third data center located in a third geographic region to be utilized as the backup data center for the domain, and replace the common name for the second data center located in the second geographic region within the address with a common name for the third data center located in the third geographic region, wherein the common name for the third data center located in the third geographic region indicates that the third data center located in the third geographic region is to be utilized as the backup data center for the domain.

Example 15 may include a cloud service provider (CSP), comprising one or more data centers located in one or more geographic regions to provide services to one or more user devices, and one or more processors to control access to the one or more data centers located in the one or more geographic regions, the one or more processors to cause access to be provided to a domain that resides in a first data center located in a first geographic region based at least in part on an address that indicates the first data center located in the first geographic region and a second data center located in a second geographic region, determine that the first data center located in the first geographic region has become unavailable, determine that the second data center located in the second geographic region is to be utilized as a backup data center for the domain based at least in part on the address, and cause access to be provided to a replica of the domain that resides in the second data center located in the second geographic region based at least in part on the determination that the first data center located in the first geographic region has become unavailable.

Example 16 may include the cloud service provider of example 15, wherein the address is a domain name system (DNS) address.

Example 17 may include the cloud service provider of example 15, wherein the address comprises a first common name that indicates the first data center located in the first geographic region and a second common name that indicates the second data center located in the second geographic region.

Example 18 may include the cloud service provider of example 17, wherein the first common name is associated with a first alias name, wherein the first alias name indicates a regional Internet protocol (IP) address for access of the domain that resides in the first data center located in the first geographic region, wherein the second common name is associated with a second alias name, and wherein the second alias name indicates a regional Internet protocol address for access of the replica of the domain that resides in the second data center located in the second geographic region.

Example 19 may include the cloud service provider of example 15, wherein the one or more processors are further to generate the address based at least in part on input from a user device, the input indicating that the second data center located in the second geographic region is to be utilized as the backup data center for the domain.

Example 20 may include the cloud service provider of example 19, wherein to generate the address comprises to include a common name corresponding to the second data center located in the second geographic region in the address based at least in part on the input indicating that the second data center located in the second geographic region is to be utilized as the backup data center for the domain.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method for failover of a domain, comprising:
   providing, by a cloud service provider (CSP), access to a domain that resides in a first data center located in a first geographic region based at least in part on an indication of the first data center being at a first location within an address that indicates the first data center located in the first geographic region and a second data center located in a second geographic region;
   determining, by the cloud service provider, that the first data center in the first geographic region has become unavailable;
   determining, by the cloud service provider, that the second data center in the second geographic region is to be utilized as a backup data center for the domain based at least in part on an indication of the second data center being at a second location within the address; and
   providing, by the cloud service provider, access to a replica of the domain that resides in the second data center in the second geographic region based at least in part on a) the determination that the second data center in the second geographic region is to be utilized as the backup data center and b) the determination that the first data center in the first geographic region has become unavailable.

2. The method of claim 1, wherein the address is a domain name system (DNS) address.

3. The method of claim 1, wherein the indication of the first data center comprises a first common name that indicates the first data center located in the first geographic region and the indication of the second data center comprises a second common name that indicates the second data center located in the second geographic region.

4. The method of claim 3, wherein the first common name is associated with a first alias name, wherein the first alias name indicates a regional Internet protocol (IP) address for access of the domain that resides in the first data center located in the first geographic region, wherein the second common name is associated with a second alias name, and wherein the second alias name indicates a regional Internet protocol address for access of the replica of the domain that resides in the second data center located in the second geographic region.

5. The method of claim 1, further comprising:
   generating, by the cloud service provider, the address based at least in part on input from a user device, the input indicating that the second data center located in the second geographic region is to be utilized as the backup data center for the domain.

6. The method of claim 1, wherein the address includes a common name for the second data center located in the second geographic region that indicates that the second data center located in the second geographic region is to be utilized as the backup data center for the domain, wherein the method further comprises:
   receiving, by the cloud service provider, an input from a user device associated with the address that indicates a third data center located in a third geographic region is to be utilized as the backup data center for the domain; and
   replacing, by the cloud service provider, the common name for the second data center located in the second geographic region within the address with a common name for the third data center located in the third geographic region, wherein the common name for the third data center located in the third geographic region indicates that the third data center located in the third geographic region is to be utilized as the backup data center for the domain.

7. One or more non-transitory computer-readable media having instructions stored thereon, wherein the instructions, when executed by one or more processors, cause a cloud service provider (CSP) to:
   provide access to a domain that resides in a first data center located in a first geographic region based at least in part on an indication of the first data center being at a first location in an address that indicates the first data center located in the first geographic region and a second data center located in a second geographic region;
   determine that the first data center located in the first geographic region has become unavailable;
   determine that the second data center located in the second geographic region is to be utilized as a backup data center for the domain based at least in part on an indication of the second data center being at a second location in the address; and
   provide access to a replica of the domain that resides in the second data center located in the second geographic region based at least in part on the determination that the second data center located in the second geographic region is to be utilized as the backup data center and the determination that the first data center located in the first geographic region has become unavailable.

8. The one or more non-transitory computer-readable media of claim 7, wherein the address is a domain name system (DNS) address.

9. The one or more non-transitory computer-readable media of claim 7, wherein the indication of the first data center comprises a first common name that indicates the first data center located in the first geographic region and the indication of the second data center comprises a second common name that indicates the second data center located in the second geographic region.

10. The one or more non-transitory computer-readable media of claim 9, wherein the first common name is associated with a first alias name, wherein the first alias name indicates a regional Internet protocol (IP) address for access of the domain that resides in the first data center located in the first geographic region, wherein the second common name is associated with a second alias name, and wherein the second alias name indicates a regional IP address for access of the replica of the domain that resides in the second data center located in the second geographic region.

11. The one or more non-transitory computer-readable media of claim 7, wherein the instructions, when executed by the one or more processors, further causes the cloud service provider to:
generate the address based at least in part on input from a user device, the input indicating that the second data center located in the second geographic region is to be utilized as the backup data center for the domain.

12. The one or more non-transitory computer-readable media of claim 11, wherein to generate the address comprises to include a common name corresponding to the second data center located in the second geographic region in the address based at least in part on the input indicating that the second data center located in the second geographic region is to be utilized as the backup data center for the domain.

13. The one or more non-transitory computer-readable media of claim 7, wherein the address includes a common name for the second data center located in the second geographic region that indicates that the second data center located in the second geographic region is to be utilized as the backup data center for the domain, wherein the instructions, when executed by the one or more processors, further cause the cloud service provider to:
receive an input from a user device associated with the address that indicates a third data center located in a third geographic region to be utilized as the backup data center for the domain; and
replace the common name for the second data center located in the second geographic region within the address with a common name for the third data center located in the third geographic region, wherein the common name for the third data center located in the third geographic region indicates that the third data center located in the third geographic region is to be utilized as the backup data center for the domain.

14. A cloud service provider (CSP), comprising:
one or more data centers located in one or more geographic regions to provide services to one or more user devices; and
one or more processors to control access to the one or more data centers located in the one or more geographic regions, the one or more processors to:
cause access to be provided to a domain that resides in a first data center located in a first geographic region based at least in part on an indication of the first data center being at a first location in an address that indicates the first data center located in the first geographic region and a second data center located in a second geographic region;
determine that the first data center located in the first geographic region has become unavailable;
determine that the second data center located in the second geographic region is to be utilized as a backup data center for the domain based at least in part on an indication of the second data center being at a second location in the address; and
cause access to be provided to a replica of the domain that resides in the second data center located in the second geographic region based at least in part on the determination that the first data center located in the first geographic region has become unavailable.

15. The cloud service provider of claim 14, wherein the address is a domain name system (DNS) address.

16. The cloud service provider of claim 14, wherein the indication of the first data center comprises a first common name that indicates the first data center located in the first geographic region and the indication of the second data center comprises a second common name that indicates the second data center located in the second geographic region.

17. The cloud service provider of claim 16, wherein the first common name is associated with a first alias name, wherein the first alias name indicates a regional Internet protocol (IP) address for access of the domain that resides in the first data center located in the first geographic region, wherein the second common name is associated with a second alias name, and wherein the second alias name indicates a regional Internet protocol address for access of the replica of the domain that resides in the second data center located in the second geographic region.

18. The cloud service provider of claim 14, wherein the one or more processors are further to:
generate the address based at least in part on input from a user device, the input indicating that the second data center located in the second geographic region is to be utilized as the backup data center for the domain.

19. The cloud service provider of claim 18, wherein to generate the address comprises to include a common name corresponding to the second data center located in the second geographic region in the address based at least in part on the input indicating that the second data center located in the second geographic region is to be utilized as the backup data center for the domain.

20. The method of claim 1, further comprising:
receiving, by the CSP, the address from a user device, wherein providing access to the domain includes providing the user device access to the domain based at least in part on the indication of the first data center within the address received, and wherein providing access to the replica of the domain includes providing the user device access to the replica of the domain based at least in part on the indication of the second data center within the address received.

* * * * *